US009086070B2

(12) United States Patent
Powell

(10) Patent No.: US 9,086,070 B2
(45) Date of Patent: Jul. 21, 2015

(54) COMPRESSORS CONTROL

(75) Inventor: Geoffrey George Powell, Oxfordshire (GB)

(73) Assignee: GARDNER DENVER DEUTSCHLAND GMBH, Bad Neustadt (Staale) (DE)

( * ) Notice: Subject to any disclaimer, the term of this patent is extended or adjusted under 35 U.S.C. 154(b) by 871 days.

(21) Appl. No.: 12/673,083

(22) PCT Filed: Jul. 18, 2008

(86) PCT No.: PCT/GB2008/002508
§ 371 (c)(1),
(2), (4) Date: Feb. 11, 2010

(87) PCT Pub. No.: WO2009/024740
PCT Pub. Date: Feb. 26, 2009

(65) Prior Publication Data
US 2012/0121440 A1    May 17, 2012

(30) Foreign Application Priority Data
Aug. 21, 2007  (GB) .................................. 0716329.8

(51) Int. Cl.
*F01B 25/06*   (2006.01)
*F04B 49/20*   (2006.01)
(Continued)

(52) U.S. Cl.
CPC ............ *F04D 27/0261* (2013.01); *F04D 27/02* (2013.01); *F04D 27/0284* (2013.01)

(58) Field of Classification Search
CPC ............ F04B 49/20; F04B 2203/0209; F04B 49/065; F04D 27/02; F04D 27/001
USPC ......... 417/22, 18, 44.2, 282; 62/228.1, 228.4; 415/16, 17
See application file for complete search history.

(56) References Cited

U.S. PATENT DOCUMENTS 3,264,841 A *  8/1966  Osborne ...................... 62/196.1
4,151,725 A *  5/1979  Kountz et al. ................... 62/182
(Continued)

FOREIGN PATENT DOCUMENTS

| CN | 1820133 | 8/2006 |
|---|---|---|
| EP | 1365155 | 11/2003 |
| WO | WO 97/38270 | 10/1997 |

OTHER PUBLICATIONS

Notification of Transmittal of the International Search Report and the Written Opinion of the International Searching Authority, in connection with PCT/GB2008/002508, dated Nov. 13, 2008; 8 pages.
(Continued)

*Primary Examiner* — Alexander Comley
(74) *Attorney, Agent, or Firm* — Michael Best & Friedrich LLP

(57) ABSTRACT

The invention relates to improvements in compressors and, in particular, to improvements in a method of controlling centrifugal compressors to maximize their efficacy. The compressor has an impeller mounted on a shaft supported by an active magnetic bearing unit and is driven by a variable speed motor at a rotational speed under normal on-load conditions at a calculated pre-surge speed for the required delivery pressure. The actual rotational speed and delivery pressure of the compressor is repeatedly measured and recorded at high frequency. The compressor is allowed to surge periodically after a preset re-calibration time and the compressor is put into a surge recovery cycle when surge is detected, during which the compressor is off-loaded and the rotational speed reduced. The compressor pre-surge speed line is recalibrated during the surge recovery cycle for the current operating conditions and reloads the compressor when the shaft speed reaches the greater of the recalibrated presurge speed line or the load speed.

4 Claims, 3 Drawing Sheets

(51) Int. Cl.
*F04B 49/06* (2006.01)
*F04D 27/02* (2006.01)

(56) References Cited

U.S. PATENT DOCUMENTS

| | | | | |
|---|---|---|---|---|
| 4,464,720 A | * | 8/1984 | Agarwal | 701/100 |
| 4,608,833 A | * | 9/1986 | Kountz | 62/228.1 |
| 5,335,507 A | * | 8/1994 | Powell | 62/129 |
| 5,553,997 A | * | 9/1996 | Goshaw et al. | 415/17 |
| 5,599,161 A | * | 2/1997 | Batson | 415/17 |
| 5,743,715 A | * | 4/1998 | Staroselsky et al. | 417/6 |
| 5,746,062 A | * | 5/1998 | Beaverson et al. | 62/228.3 |
| 5,924,847 A | * | 7/1999 | Scaringe et al. | 417/42 |
| 5,967,742 A | * | 10/1999 | Mirsky et al. | 415/1 |
| 6,213,724 B1 | * | 4/2001 | Haugen et al. | 417/63 |
| 6,463,748 B1 | * | 10/2002 | Benedict et al. | 62/228.1 |
| 6,793,456 B2 | * | 9/2004 | Kotani et al. | 415/1 |
| 7,069,734 B2 | * | 7/2006 | Knopp | 62/129 |
| 2005/0076656 A1 | * | 4/2005 | Bodell et al. | 62/83 |
| 2005/0144965 A1 | * | 7/2005 | Ueda et al. | 62/228.1 |
| 2007/0065300 A1 | * | 3/2007 | Mariani et al. | 417/243 |

OTHER PUBLICATIONS

Gravdahl, Jan Tommy and Egeland, Olav; "Speed and Surge control for a low order centrifugal compressor model", Proceedings of the 1997 IEEE International Conference on Control Applications, Hartford, CT, Oct. 5-7, 1997; pp. 344-349.
Combined Search and Examination Report under Sections 17 and 18(3) for related application GB0813247.4, date Oct. 14, 2008; 5 pages.
English translation of Chinese Office Action regarding related case, Application No. 200880103699.7, May 31, 2013.
English Abstract for CN1820133, Aug. 16, 2006.
Search report from Australian companion case AU2008290428, references cited therein cited by U.S. Examiner. Jun. 18, 2012.

* cited by examiner

COMPRESSORS CONTROL

CROSS-REFERENCE TO RELATED APPLICATION

This Application is a Section 371 National Stage Application of International Application No. PCT/GB2008/002508, filed Jul. 18, 2008, published as WO 2009/024740, in English, the content of which is hereby incorporated by reference in its entirety.

The invention relates to improvements in compressors and, in particular, to improvements in a method of controlling centrifugal compressors to maximise their efficacy.

The operating characteristics of a compressor are generally defined by the relationship between the pressure ratio and volume or mass flow rate. Its useful operational range is limited by surge and choke, which are ideally to be avoided and the maximum permissible compressor speed.

Compressor surge occurs when the discharge pressure is greater than the pressure within the compressor such that the air flow can no longer adhere to the suction side of the compressor blades and the discharge process is interrupted. During surge the air flow through the compressor is reversed until a stable pressure ratio with positive volume flow rate is reached. Normal flow resumes until the pressure builds up again and the cycle repeats.

Surge is an inherent feature of centrifugal and other dynamic compressors. This unstable operating condition can cause high vibration and damage to the compressor and disruption to the operating system. Compressor manufacturers have therefore tried to develop controls and control algorithms to prevent surge, and to allow compressors to operate as close to the surge line as possible as the compressor best efficiency point may be nearer the surge line, and to give the maximum operating range. The surge line is a calculated profile of the compressor shaft rotational speed against the compressor system delivery pressure providing an on-load to off-load boundary condition that will maintain a working compressor without entering a surge cycle.

Once surge is detected, normal practice would be to unload the compressor to prevent damage to the compressor. Prior art methods for detecting surge include vibration detection, measurement of temperature upstream of the impeller to detect backflow of hot gas, and calculation of the surge line based on inlet and operating conditions.

The main disadvantage of these methods is that, once surge has been detected, the compressor is shut down and operator intervention is required to get the compressor back on-line.

Another method of avoiding surge includes placing a prohibited range on the compressor operation based on the possible conditions of operation which may be encountered. The disadvantage of this approach is that the allowable flow range from the compressor is overly limited and its operation is not optimised.

In other prior art methods of avoiding surge, attempts have been made to match the compressor throughput to the process requirements while keeping the total flow high enough to prevent surge without the need to shut the system down. On the control side, anti-surge systems have been designed using pneumatic minimum flow controllers and electronic controllers with special algorithms. One stability control algorithm is described in US-2005/0076656A which is used to control a variable geometry diffuser and a hot gas by-pass valve in response to the detection of compressor instabilities. The algorithm adjusts the position of a ring within the diffuser in response to the detection of a surge condition.

U.S. Pat. No. 4,464,720 describes an alternate surge control system which utilises an algorithm to calculate a desired differential pressure and to compare the calculated result with the actual differential pressure. A controller is provided for operating a blow-off valve to bring the actual differential pressure back to the calculated differential pressure.

However, it is an object of the present invention to provide an improved method of controlling the operation of a dynamic compressor to avoid the problems caused by surging and optimising its efficiency without the need for stopping the compressor when surge occurs.

The invention therefore provides a method of controlling a centrifugal compressor to provide compressed gas at a required delivery pressure;

said compressor having an impeller mounted on a shaft supported in an active magnetic bearing unit;

said compressor being driven by a variable speed motor at a rotational speed under normal on-load conditions at a calculated pre-surge speed for the required delivery pressure;

wherein the actual rotational speed and delivery pressure of the compressor is repeatedly measured and recorded at high frequency the compressor is allowed to surge periodically after a preset re-calibration time; the compressor is put into a surge recovery cycle when surge is detected, during which the compressor is off-loaded and the rotational speed reduced;

the compressor pre-surge speed line is recalibrated during the surge recovery cycle for the current operating conditions; and reloads the compressor when the shaft speed reaches the greater of the recalibrated pre-surge speed line or the load speed, said load speed being a pre-set value determined to be below the maximum speed of the compressor but above the range of speeds likely to cause run-up surges as determined from the compressor characteristics.

The invention further provides a compressor system comprising a centrifugal compressor having an impeller mounted on a shaft supported in an active magnetic bearing unit, a variable speed motor to drive the compressor and a control system, said control system including:— means for repeatedly measuring and recording delivery pressure of compressed air at an outlet of the compressor and rotational speed of the compressor;

means for presetting a recalibration time after which the compressor is allowed to enter a surge cycle;

means for transmitting signals to the motor to reduce or increase the speed of the compressor;

means for putting the compressor into a surge recovery cycle when surge is detected; and means for recalibrating the compressor pre-surge line according to the aforementioned method.

The invention will now be described, by way of example only, with reference to the accompanying drawings in which:—

Figure 1:
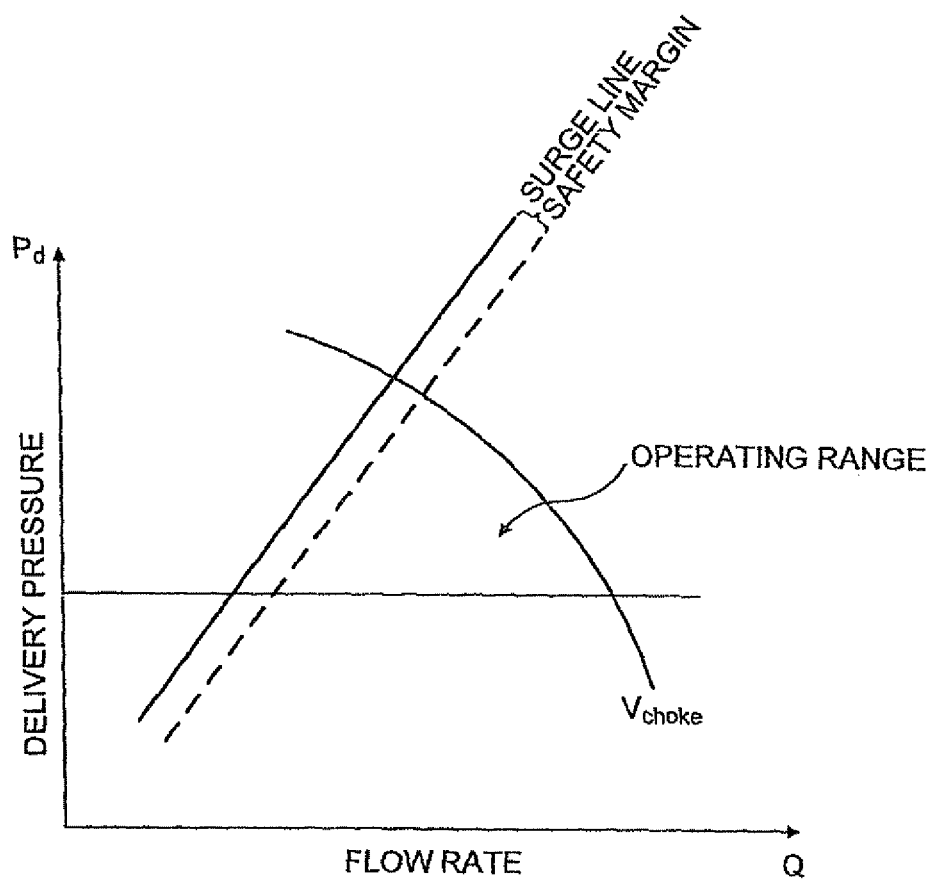
FIG. 1 is a graph showing delivery pressure against flow rate for a centrifugal compressor and a surge line with prior art style safety margin.

The surge line of a compressor is predefined by the delivery pressure $P_d$ and flow rate Q, as shown in FIG. 1. The delivery pressure $P_d$ is the pressure of the compressed air measured at the outlet of the compressor. For any given delivery pressure $P_d$ the operating range used in prior art systems for the flow rate Q is below a safety margin, designed to cover all anticipated operating conditions. As mentioned previously, this leads to a loss in the ideal operating range, particularly as the compressor efficiency may be optimised close to the surge line.

In the method of the present invention a control system is used to control the compressor operation which, unlike the prior art systems, periodically allows a surge cycle of the compressor to start. Therefore, rather than relying on a prediction of the surge point for a fixed set of operating conditions, the actual surge point is known for the current actual operating conditions and this is used as the basis for recalibrating the pre-surge line to enable the compressor to operate at its optimum efficacy for the current operating conditions.

To achieve this, the present invention utilizes a variable speed motor driving a centrifugal compressor, the impeller of which is mounted on a shaft supported in active magnetic bearings (AMBs). The use of a variable speed motor means that the compressor speed can be quickly controlled and the AMBs allow the compressor to start surging without damaging the bearings or any other part of the compressor. The shaft position remains controlled by the bearings even in the event of surge and this enables the invention to use the actual surge point to define the lower range of operation for any given pressure at the ambient conditions pertaining at the time of surge.

In the present system, an initial pre-surge line is calculated based on the prevailing start up conditions. The pre-surge line is calibrated from the pre-surge speed at a given delivery pressure, the pre-surge speed being a calculated speed just greater than the speed at which the compressor surges under the present dynamic operating conditions.

As operating conditions change, the pre-surge line is likely to move, so the method of the present invention allows the compressor to surge. This enables the pre-surge line to be recalibrated for the current operating conditions, thereby optimising its operation. When surge is detected, the compressor is put into a surge recovery cycle, which obviates the need to stop the compressor, and the control system recalibrates the pre-surge line.

The pre-surge line speed calculation is based on the following equation:

$$V_s = mP_d + x$$

where
$V_s$=pre-surge speed (rpm)
$P_d$=delivery pressure (bar)
m=a gradient which is determined by the characteristics of the compressor
x=a variable determined by the pre-surge line calibration plus a speed margin.

For ease of operation the compressor is provided with a human machine interface (HMI) which displays all the working parameters and allows the operator to set certain limits and modes of operation of the compressor control.

Figure 2:
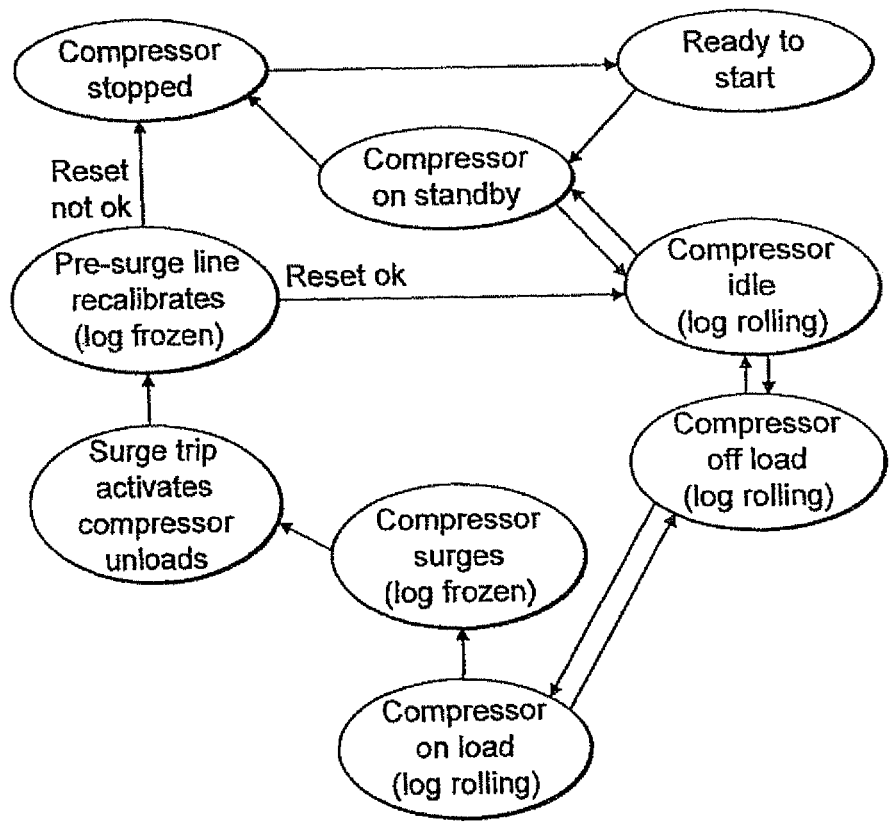
FIG. 2 is a flow diagram showing the operational steps of the method of the present invention.
Figure 3:
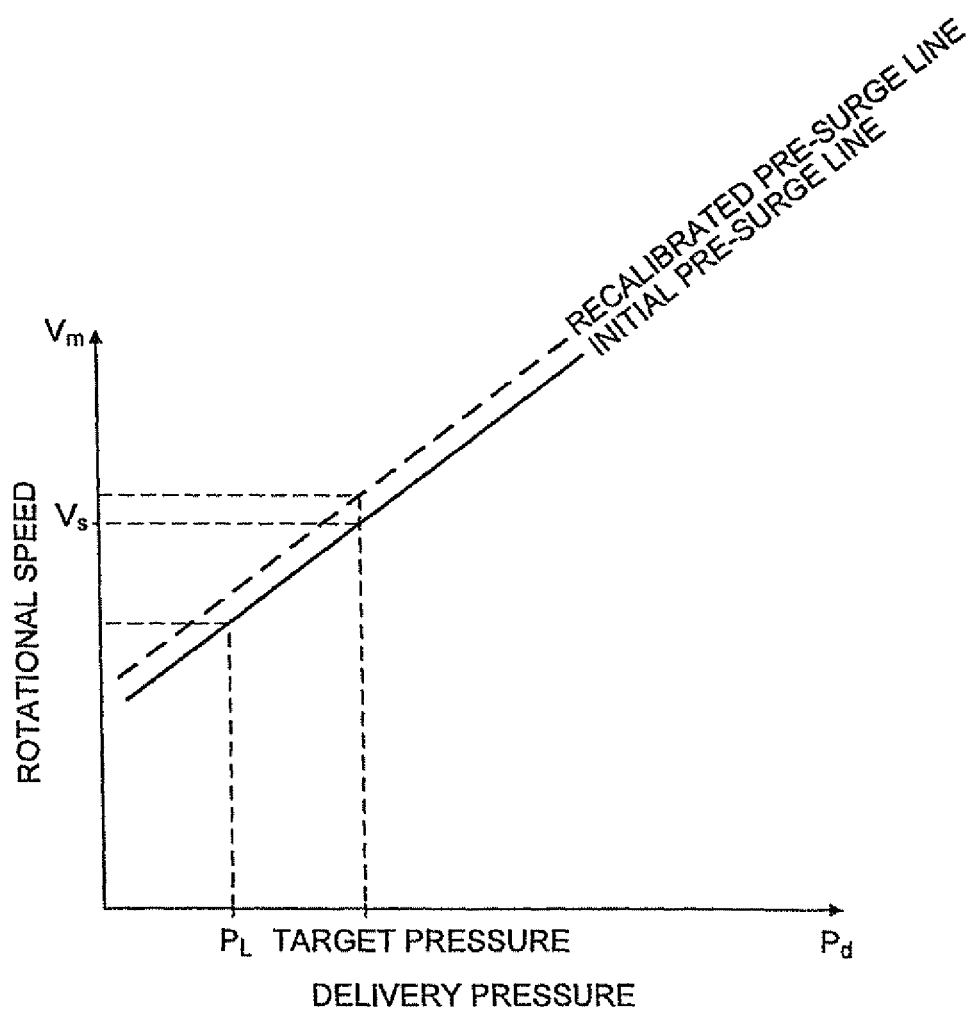
FIG. 3 is a graph showing rotational speed against delivery pressure for a centrifugal compressor and a pre-surge line within.

Referring to FIG. 2 the compressor is brought from idle to on-load, the rotational speed of the compressor $V_m$ is ramped up. When the rotational speed $V_m$ exceeds the dynamically calculated pre-surge speed $V_s$ (see FIG. 3), or load speed, whichever is greater. The compressor is loaded and the speed $V_m$ controlled to provide the target delivery pressure Pd without crossing the pre-surge line.

Under normal operating conditions the delivery pressure $P_d$ will remain fairly constant with the rotation speed $V_m$ varying as air demand dictates. Should the speed/pressure operating point approach and cross the pre-surge line, and the compressor surges, a surge trip is activated by an alarm signal from the AMB unit which starts the surge recovery cycle. This surge trip activates a by-pass valve which causes the compressor to unload and signals the drive motor to slow the rotational speed $V_m$ to an idle condition until such time as the delivery pressure $P_d$ becomes less than the pre-set load pressure $P_l$. At this point the compressor rotational speed $V_m$ is ramped back up until its speed exceeds the pre-surge line, or load speed, whichever is greater, the compressor reloads and resumes normal operation. The pre-surge line is recalibrated during the surge recovery cycle, which typically lasts for several seconds to accommodate any climatic or operating condition change that may have occurred and thereby maintain the compressor operation in its optimum performance band. A mechanism is provided to enable the periodic recalibration of the pre-surge line by allowing a surge cycle to initiate after a pre-set recalibration time T. The recalibration time T can be pre-set by the operator through the HMI. On expiry of the recalibration time T, the controller resets the pre-surge speed line significantly below its current position, by adjustment of the x term. This allows the compressor to surge when the speed/pressure operating point enters the surge region according to the prevailing operating conditions.

The compressor control system repeatedly records and stores the actual delivery pressure $P_d$ and shaft speed $V_a$, which is the rotational speed of the compressor shaft and rotor as measured by the drive unit. When surge occurs and the surge recovery cycle commences, the rolling log is temporarily frozen. The surge line recalibration is achieved by selecting from the frozen log the delivery pressure $P_d$ recorded fractionally before surge occurred. Using the existing value of variable x in the aforementioned formula, the theoretical pre-surge speed $V_s$ is calculated. This value is subtracted from the actual surge speed $V_a$ taken from the frozen log for the same time frame as the measured delivery pressure $P_d$. This speed difference ($V_s - V_a$) is used to adjust the value of the variable x to provide a new value of x which is appropriate for the current operational conditions and which is used in the subsequent calculation of the pre-surge speed $V_s$.

The load pressure $P_l$ is an operator set value. If the delivery pressure $P_d$ falls below the load pressure $P_l$, then the calculation of the pre-surge speed $V_s$ uses the load pressure $P_l$ instead of the delivery pressure $P_d$.

The advantage of this method of controlling the compressor is that it enables the compressor to be used over its full operating range for any given set of climatic and systems conditions. As the pre-surge line moves with environmental conditions, so does the allowable envelope of compressor operation, thus maximising the overall energy efficiency of the compressor.

Occasions will arise when surge occurs while the compressor speed is initially ramping up (these are known as run-up surges) and the actual surge speed will be less than the theoretical pre-surge speed $V_s$. This generally occurs from a cold start-up before any calibration has been preformed to cater for the climatic condition of surge, or when a calibration is imminent and the compressor is stopped and then restarted. In these circumstances a lower value of the variable x would be calculated and hence reduce the pre-surge speed $V_s$. This would have the effect of allowing the compressor to load sooner in the ramp up of speed and possibly cause more run-up surges.

To overcome this problem, when the compressor is started, the compressor is inhibited from going onload until the rotational speed is greater than, or equal to, the load speed, or the pre-surge speed, whichever is greater. The load speed is pre-set value determined to be below the maximum speed of the compressor, but above the range of speeds likely to cause run-up surges, as determined from the compressor characteristics. Once the compressor reaches the load speed, the load inhibition is removed and compressor can be put on load. If a run-up surge is encountered, the pre-surge line is raised to a point below the maximum shaft rotational speed and the recalibration time T is forced to a relatively low value of typically less than a minute. This will have the effect of allowing the compressor rotational speed to reach a higher value before the compressor is loaded, subsequent run-up surges are prevented and then, once the recalibration time T expires, allowing a calibration of the pre-surge speed line at the next surge. After this surge and recalibration, the compressor is brought back on load and the recalibration time is also set back to its original setting after a suitable time.

The invention claimed is:

1. A method of controlling a centrifugal compressor to provide compressed gas at a required delivery pressure, said compressor having an impeller mounted on a shaft supported by an active magnetic bearing unit, said compressor being driven by a variable speed motor at a rotational speed under normal on-load conditions, said method comprising the steps of:

operating a centrifugal compressor under a pre-determined speed at normal on-load conditions to result in a delivery of a compressed gas at a pre-determined delivery pressure;

measuring and recording an actual rotational speed and an actual delivery pressure of the compressor repeatedly at high frequency;

periodically surging the compressor after a preset re-calibration time;

detecting said surge of said compressor at said preset re-calibration time;

initiating a surge recovery cycle of the compressor when said surge is detected, wherein said surge recovery cycle comprises off-loading the compressor and reducing the actual rotational speed of the compressor;

re-calibrating a pre-determined compressor pre-surge speed line during the surge recovery cycle for current operating conditions;

increasing the actual rotational speed of the compressor after the reducing the actual rotational speed step of the surge recovery cycle;

reloading the compressor when the actual rotational speed is increased to the greater of the re-calibrated compressor pre-surge speed line and a pre-set load speed;

wherein the step of re-calibrating the pre-determined compressor pre-surge speed line includes adjusting the pre-determined compressor pre-surge speed line based upon a speed difference, the speed difference comprises a difference between a measured pressure rotational speed of the compressor which corresponds to a measured pressure delivery pressure, wherein both the measured pre-surge rotational speed and the measured pre-surge delivery pressure are obtained fractionally before the compressor surge is detected, and a pre-determined pre-surge rotational speed of the compressor for the measured pre-surge delivery pressure, wherein the pre-determined pre-surge rotational speed falls on the pre-determined compressor pre-surge speed line prior to the re-calibrating step; and wherein the pre-determined pre-surge speed for any delivery pressure is calculated using the formula $$V_s = mP_d + x$$

wherein $V_s$ is the pre-determined pre-surge speed; m is a gradient determined by operational characteristics of the compressor; $P_d$ is the measured delivery pressure and x is a variable which is adjusted during each surge recovery cycle based on the speed difference.

2. A method as claimed in claim 1, wherein the rotational speed of the compressor is measured by an active magnetic bearing drive unit.

3. A method as claimed in claim 1 further comprising using a preset load pressure in place of the measured delivery pressure as variable $P_d$ for calculating the pre-determined pre-surge speed when the measured delivery pressure is less than the preset load pressure.

4. A method as claimed in claim 1, further comprising setting the re-calibration time to a new value, when a surge occurs while the compressor speed is increased after initially being put on-load.

* * * * *